United States Patent
Staiger (10) Patent No.: US 8,856,370 B2
(45) Date of Patent: Oct. 7, 2014

(54) CONCURRENT FLASHING OF DATA PROCESSING UNITS IN HIERARCHICAL NETWORKS

(75) Inventor: Dieter E. Staiger, Weil im Schoenbuch (DE)

(73) Assignee: International Business Machines Corporation, Armonk, NY (US)

(*) Notice: Subject to any disclaimer, the term of this patent is extended or adjusted under 35 U.S.C. 154(b) by 1949 days.

(21) Appl. No.: 11/722,391

(22) PCT Filed: Jun. 18, 2005

(86) PCT No.: PCT/EP2005/053444
§ 371 (c)(1),
(2), (4) Date: Jun. 21, 2007

(87) PCT Pub. No.: WO2006/051003
PCT Pub. Date: May 18, 2006

(65) Prior Publication Data
US 2010/0115120 A1    May 6, 2010

(30) Foreign Application Priority Data
Nov. 5, 2004 (EP) .................. 04105703

(51) Int. Cl.
*G06F 15/16* (2006.01)
*H04L 29/08* (2006.01)

(52) U.S. Cl.
CPC ............. *H04L 67/34* (2013.01); *H04L 69/329* (2013.01); *H04L 67/12* (2013.01)
USPC ........................ 709/231; 709/208; 709/227

(58) Field of Classification Search
USPC ........................................ 709/231
See application file for complete search history.

(56) References Cited

U.S. PATENT DOCUMENTS

2003/0043779 A1* 3/2003 Remboski et al. ............ 370/351
2003/0225485 A1* 12/2003 Fritz et al. ........................ 701/1

FOREIGN PATENT DOCUMENTS

| CA | 2312864 A1 | 12/2001 |
| WO | 0210908 A | 2/2002 |
| WO | 03021879 A | 3/2003 |

* cited by examiner

*Primary Examiner* — Tonia L Dollinger
*Assistant Examiner* — Adam Cooney
(74) *Attorney, Agent, or Firm* — Stephen R. Tkacs; Stephen J. Walder, Jr.; John D. Flynn (57) ABSTRACT

The present invention provides an electronic network with a plurality of processing units that are arranged in sub-networks in a hierarchical and heterogeneous way. The network features a data stream controller that is coupled to any one of the sub-networks and that is adapted to transmit data to any one of the sub-networks. Further, the network has a data transmission port that is coupled to the data stream controller and that provides a high-speed data transmission to the data stream controller. The data stream controller serves to concurrently provide data and in particular flashing data to the various control units in a way that is adapted to the communication protocol and the data transfer rate of each sub-network. The invention therefore provides fast and autonomous flashing of a plurality of processing units, such as electronic control units in a network embedded system such as commonly used in the framework of automotive electronic networks. The data stream controller and its coupling to the various sub-networks provides a non-hierarchical and direct access to any sub-network and/or control unit of a heterogeneous and hierarchical network.

18 Claims, 5 Drawing Sheets

CONCURRENT FLASHING OF DATA PROCESSING UNITS IN HIERARCHICAL NETWORKS

TECHNICAL FIELD

The present invention relates to the field of feeding data into data processing units of a hierarchical network that are arranged in various sub-networks.

DESCRIPTION OF RELATED ART

The implementation and embedding of electronic control units (ECU) or processing units is constantly growing in particular within the framework of automobile technology, industrial manufacturing technology as well as home entertainment or home appliances. In all these systems, a processing unit has to fulfill a distinct predefined function. Electronic systems featuring a plurality of such processing units are therefore denoted as networked embedded systems.

Complex electronic embedded systems have a large number of electronic control units that have to communicate with each other and/or have to exchange some data. For example, in today's high-end automobiles there exist up to about 100 processing units or electronic control units (ECU) that provide control of the vehicle functions. Typically, the plurality of electronic control units is arranged in various individual network branches, each of which providing a particular functionality for the vehicle control. Hence, each ECU in an automotive environment is designated and designed for a distinct purpose and features different requirements with respect to real-time behavior, data exchange rate, signal transmission and signal processing.

Therefore, various control units are arranged in sub-networks with respect to their signal processing and signal transmission properties. For example, real-time demanding processing units, like engine control, breaking system or body control are arranged in a sub-network making use of a real-time and highly reliable bus protocol. Other control units that are, e.g. related to passenger comfort or passenger convenience, like infotainment related control units, may be arranged in a sub-network making use of a less reliable and low cost communication platform and/or bus protocol.

Typically, the various sub-networks feature a gateway unit or a gateway controller that provides interaction and communication between ECUs of different sub-networks. Hence, the gateway controllers connect the various sub-networks and regulate the communication transfer between the different bus systems.

In the automotive environment the overall architecture of the communication platform between the electronic control units features a heterogeneous and hierarchical structure. This is mainly due to continuous adaptive implementation of various communication technologies into existing electronic embedded systems. However, the heterogeneous and hierarchical structure is rather disadvantageous because the gateway controllers represent bottlenecks for the data transfer within the network and further represent single points of failures. For example, if a particular gateway controller is subject to failure, the entire heterogeneous network will break down. At least the functionality of an involved network branch will no longer be available.

Figure 1:
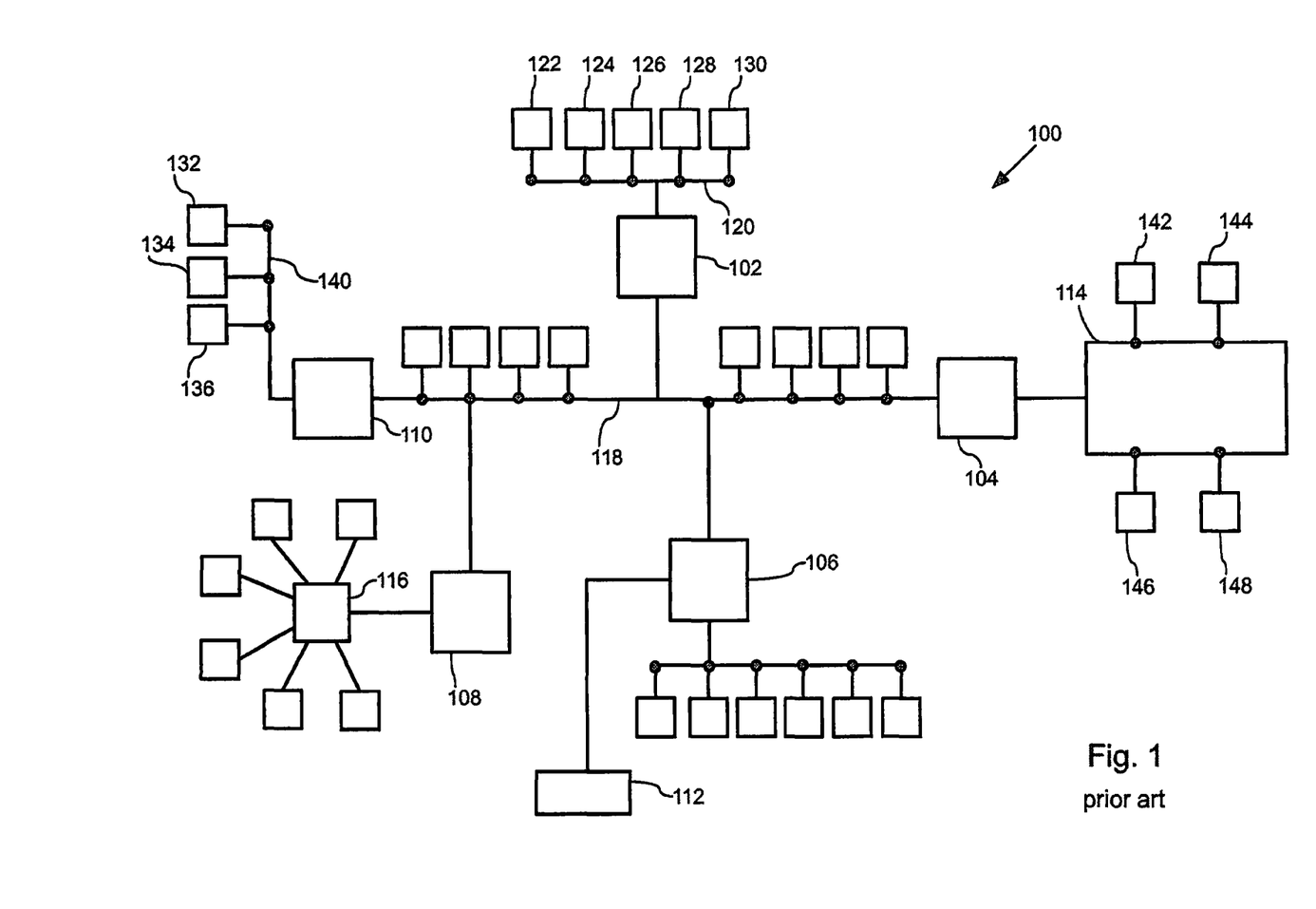
FIG. 1 shows a prior art implementation of a heterogeneous and hierarchical network of processing units.

FIG. 1 illustrates a prior art implementation of a networked embedded system 100, featuring a plurality of sub-networks 114, 116, 118, 120 and 140. For example, sub-network 120 is implemented as a straight bus network and provides communication and data transfer to the processing units 122, 124, 126, 128 and 130. The gateway controller 102 provides access and data transfer between any of the processing units 122, . . . , 130 with other processing units of the networked embedded system 100. Furthermore, the sub-networks may feature a different topology and may exploit different bus protocols. Sub-network 114 is implemented by means of the ring-bus topology, sub-network 116 features a star topology and sub-networks 120 and 140 feature a straight bus topology.

For example sub-network 120 might be implemented as a control area network (CAN) bus system or local interconnect network bus system (LIN), sub-network 140 might be implemented as a CAN or any other real-time network and sub-network 116 might be realized as a Flexray bus system. Moreover, the ring-bus network 114 may provide communication for processing units 142, 144, 146, 148 that are related to multi-media applications. Therefore, the ring-bus 114 might be implemented as a media oriented system transport (MOST) bus system.

As can be seen from FIG. 1, the gateway controllers 102, 104, 106, 108, 110 represent bottlenecks for communication between any two, or various processing units and hamper diagnosis as well as maintenance of the overall network. Most prior art implementations of automobile networked embedded systems feature a diagnostic port 112 that provides external access to any one of the sub-networks or to any of the processing units. Typically, each processing unit or ECU 122, . . . , 126, 142, . . . , 148 features a non-volatile memory that may e.g. be implemented as EEPROM or flash memory to store runtime programs, micro-code and some key data in a non-volatile way. However, in case of failure or availability of a software update, an updating or modification of the non-volatile memories of various dedicated or of all control units might be required. In particular due to the heterogeneous structure it is often difficult and very cumbersome to exactly allocate a failure of a distinct ECU or a gateway controller.

Therefore, even a complete flashing of all memories of all ECUs or processing units might be required. The diagnostic port 112 therefore serves as an access point to the embedded networked system and provides diagnosis as well as feeding of data streams into the various ECUs and sub-networks. Due to the complex nature of the heterogeneous and hierarchical networked embedded structure, such a complete flashing process requires an insufficient long time, because e.g. slow-speed buses connect high-speed buses and therefore represent indispensable bottlenecks for the flashing procedure. For example for a high-end vehicle, a complete flashing process may take 10 to 18 hours. Since these re-flashing processes have to be performed by trained personnel of vehicle service stations, such a re-flashing procedure is rather cost intensive and is also associated with an unacceptable downtime of the entire vehicle. Due to the continuous tendency of implementing more and more electronic components and electronically controlled systems in the automotive environment, the above described disadvantages may become more and more prominent.

The present invention therefore aims to provide an improved electronic embedded network that allows for an efficient and less time intensive diagnosis and flashing of electronic control units and entire sub-networks of heterogeneous and hierarchical networks and networked embedded systems.

BRIEF SUMMARY

A hierarchical network of processing units comprises a plurality of sub-networks comprising at least a first sub-network and a second sub-network. Each sub-network within the plurality of sub-networks comprises at least one processing unit. Each sub-network within the plurality of sub-networks is connected to the hierarchical network via a gateway controller. The network further comprises a data stream controller directly coupled to each sub-network within the plurality of sub-networks and adapted to transmit data to processing units and gateway controllers within the plurality of sub-networks. The network further comprises a data transmission port coupled to the data stream controller. The data transmission port feeds flashing data into the data stream controller. The data stream controller is adapted to flash at least a first gateway controller or processing unit within a first sub-network within the plurality of sub-networks and at least a second gateway controller or processing unit within a second sub-network within the plurality of sub-networks using the flashing data.

A data stream controller transmits data to a hierarchical network of processing units. The data stream controller is coupled to any one of the sub-networks and to a data transmission port. The hierarchical network of processing units comprises a plurality of sub-networks comprising at least a first sub-network and a second sub-network. The plurality of sub-networks comprises at least one processing unit. Each sub-network within the plurality of sub-network is connected to the hierarchical network via a gateway controller. The data stream controller comprises a storage for storing flashing data received via the data transmission port. The data stream controller is directly coupled to each sub-network within a plurality of sub-networks and adapted to transmit data to processing units and gateway controllers within the plurality of sub-networks. The data stream controller further comprises a control unit for feeding the flashing data into the storage and for providing the first sub-network and the second sub-network with a first and second portion of the flashing data. The control unit is adapted to flash at least a first gateway controller or processing unit within a first sub-network within the plurality of sub-networks and at least a second gate controller or processing unit within a second sub-network within the plurality of sub-networks using the flashing data.

A method is provided for flashing processing units of a hierarchical network comprising a plurality of sub-network comprising at least a first sub-network and a second sub-network. The plurality of sub-networks comprises at least one processing unit and wherein each sub-network within the plurality of sub-network is connected to the hierarchical network via a gateway controller. The method of flashing comprises feeding flashing data into a data stream controller by making use of a high-speed data transmission port coupled to the data stream controller. The data stream controller is directly coupled to each sub-network within the plurality of sub-networks and adapted to transmit data to processing units and gateway controllers within the plurality of sub-networks. The method further comprises flashing, by the data stream controller, at least a first gateway controller or processing unit within a first sub-network within the plurality of sub-networks and a second gateway controller or processing unit within the plurality of sub-networks using the flashing data.

BRIEF DESCRIPTION OF THE DRAWINGS

In the following preferred embodiments of the invention will be described in detail by making reference to the drawings in which.

DETAILED DESCRIPTION OF AN
ILLUSTRATIVE EMBODIMENT

According to a preferred embodiment of the invention, the data transmission port is coupled to the data stream controller via a high-speed data transmission line. Further, the data stream controller has a dynamic memory that allows storing of the data that is fed into the data stream controller. In particular, the high-speed data transmission line might be implemented by e.g. a high-speed Ethernet connection featuring data transmission rates well above 1 Gigabit per second. In this way a large amount of data that is required for an entire flashing procedure can be fed from a vehicle service station to the data stream controller via the data transmission port in a relatively short time interval.

For example, by making use of e.g. an Ethernet connection, an amount of data in the range of several tens or even hundreds of Megabytes can in principle be transferred into the data stream controller within a time interval of a few seconds. With respect to e.g. a flashing scenario of the ECUs of a vehicle, the time interval required for feeding flashing data into the networked embedded system of the vehicle can be drastically reduced. Instead of several hours the data can be fed into the data stream controller of the automotive network within a few seconds. Advantages with respect to expenses of a vehicle service station are obvious.

According to a further preferred embodiment of the invention, the first and second sub-networks have different data transmission properties and make use of different communication protocols. Consequently, the data stream controller is adapted to transmit data to a distinct sub-network by making use of the sub-network's data transfer rate and communication protocol. Hence, the data stream controller provides decoding of data to any sub-network specific communication protocol, data transfer rate, real-time behavior and other general signal transmission properties.

According to a further preferred embodiment of the invention, the data stream controller is further adapted to feed data into any one of the processing units of the at least first and second sub-networks. Hence, the data stream controller is not only adapted to transmit data into any one of the sub-networks but also to directly access a particular processing unit of a sub-network. In this way, the data stream controller serves to selectively diagnose and to selectively manipulate distinct processing units of any of the at least first and second sub-networks. In this way, the data stream controller not only has direct access to the various sub-networks but it is also capable of directly accessing and controlling any of the processing units.

According to a further preferred embodiment of the invention, the data stream controller is further adapted to control an at least first and second gateway controller of the at least first and second sub-networks. In particular, the data stream controller is capable to overrule the functionality of a gateway controller of a sub-network. In this way the data stream controller may gain complete access and control of a sub-network, which is advantageous in case of failure of a gateway controller and/or in case of e.g. flashing of all processing units of the sub-network. Since a flashing procedure represents a major intervention into the operation of a sub-network, by transferring the control over a sub-network to the data stream controller it can be effectively prevented that the gateway controller interferes with any of its processing units during a flashing procedure.

According to a further preferred embodiment of the invention, the data stream controller is further adapted to simultaneously flash the at least first and second gateway controllers and/or processing units of the at least first and second sub-networks or to flash the at least first and second gateway controllers and/or processing units within partially overlapping time intervals. In this way by making use of the data stream controller flashing of various sub-networks and associated control units does no longer have to be performed sequentially. Instead, the inventive implementation of the data stream controller allows for a simultaneous flashing of various sub-networks and associated processing units. This simultaneous flashing procedure might be performed strictly simultaneously but also within partially overlapping time intervals.

For example, initializing and termination of flashing procedures for various sub-networks might be performed at various points of time. Also flashing of various sub-networks might be triggered simultaneously, but due to the heterogeneous structure and different data transmission properties of the various sub-networks, the flashing procedure may require sub-network specific flashing times.

According to a further preferred embodiment of the invention, the data stream controller is adapted to transmit a first data to the at least first sub-network by means of the first sub-network's data transmission protocol and by means of the first sub-network's data transmission rate. In a corresponding way, the data stream controller is adapted to transmit a second data to the at least second sub-network by making use of the second sub-network's data transmission protocol and by means of the second sub-network's data transmission rate. In this way, the data stream controller provides transformation and decoding of flashing data with respect to a communication protocol and general data transmission properties of each particular sub-network that is connected to the data stream controller.

According to a further preferred embodiment of the invention, the data stream controller is adapted to gather status information of the at least first and second sub-networks. Moreover, the data stream controller may also gather information of any of the processing units of the at least first and second sub-networks. In this way, the data stream controller effectively allows to selectively and independently diagnose any of the sub-networks, gateway controllers and processing units on demand.

Hence, any diagnostic data representing the status of a sub-network or a processing unit does not have to be routed and transferred via various gateway controllers but can be directly provided to the data stream controller that is connected to any one of the sub-networks. In this way, data traffic referring to system maintenance and system diagnostics can be entirely provided by coupling of the data stream controller to any of the sub-networks. In this way the gateway controllers and various sub-networks are released from routing diagnostic and flashing data between a diagnostic port and other sub-networks or processing units.

According to a further preferred embodiment of the invention, the data stream controller is adapted to replace the functionality of the at least first and/or second gateway controllers of the at least first and second sub-networks if the at least first and/or second gateway controllers fail. Since the data stream controller has separate access to any one of the sub-networks it may compensate a failure of a gateway controller and may therefore be adapted to route any data traffic to and from a sub-network whose gateway controller does no longer work properly. In this way the inventive network architecture with the embedded data stream controller allows to realize autonomic embedded computing and to autonomously compensate system and/or network failures. In general, the data stream controller based implementation of the hierarchical network allows to effectively eliminate and to replace bottlenecks and single points of failure of the overall network.

According to a further preferred embodiment of the invention, the processing units of the hierarchical network are implemented as electronic control units of a vehicle. Moreover, the hierarchical network itself may represent a heterogeneous network of electronic control units of a vehicle. The inventive network might be realized as an extension to existing electronic networks. In principle, the inventive network can be implemented as an upgrade to existing prior art electronic networks for e.g. vehicles. By purchasing the data stream controller and the data transmission port as an extension module, a realization of the inventive network on the basis of already existing prior art networks is generally conceivable. Also, data stream controller and data transmission port might be manufactured and commercially distributed as an extension module for vehicle electronics, provided that the embedded networked structure features individual transmission lines to at least some of the sub-networks.

According to a further preferred embodiment of the invention, the at least first and second sub-networks may feature a plurality of different network topologies, such as straight bus, star network or ring-bus and may further make use of different data transmission standards, such like CAN C, CAN B, LIN, FlexRay, MOST and FireWire.

In another aspect, the invention provides a data stream controller for transmitting data to an at least first and second sub-network of a hierarchical network of processing units. The data stream controller is coupled to any one of the sub-networks and to a data transmission port. The data stream controller comprises a storage for storing data that is received via the data transmission port and a control unit for feeding the received data into the storage and for providing the at least first and second sub-networks with an at least first and second portion of the data.

According to a preferred embodiment of the invention, the data stream controller further comprises a decoder module for decoding the at least first and second portions of the data with respect to a data transmission rate and with respect to a communication protocol of the at least first and second sub-networks.

According to a further preferred embodiment of the invention, the storage of the data stream controller is implemented by means of synchronous dynamic random access memory (SDRAM) or double data rate synchronous dynamic access memory (DDR-SDRAM).

In still another aspect, the invention provides a method of flashing processing units of a hierarchical network that is divided into an at least first and second sub-network. The inventive method of flashing comprises the steps of feeding of data into a data stream controller by making use of a high-speed data transmission port that is coupled to the data stream controller. Thereafter, the method comprises flashing the processing units of at least one of the at least first and second sub-networks by making use of the data stream controller that is coupled to any one of the at least first and second sub-networks. The flashing can either be performed simultaneously or within overlapping time intervals. Hence, various sub-networks can be flashed in parallel, thus reducing the flashing time of the overall hierarchical network.

According to a further preferred embodiment of the invention, flashing of the processing units of the at least one of the at least first and second sub-networks can be started prior to a termination of the feeding of the data into the data stream controller. Hence, the data stream controller might be fed with data via the data transmission port and before termination of this data transmission into the data stream controller, the data stream controller might already trigger flashing of various processing units of the at least first and/or second sub-networks.

In still another aspect, the invention provides a computer program product for a data stream controller of an hierarchical network of processing units that are arranged in at least a first and a second sub-network. The data stream controller is coupled to any one of the sub-networks and to a data transmission port. The inventive computer program product is further operable to receive data via the data transmission port and to store the received data in a storage of the data stream controller. Further, the computer program product is operable to decode an at least first and second portion of the data with respect to data transmission rates and with respect to communication protocols of the at least first and second sub-networks. Additionally, the computer program product is further operable to transmit the at least first and second portions of the data to the at least first and second sub-networks.

Figure 2:
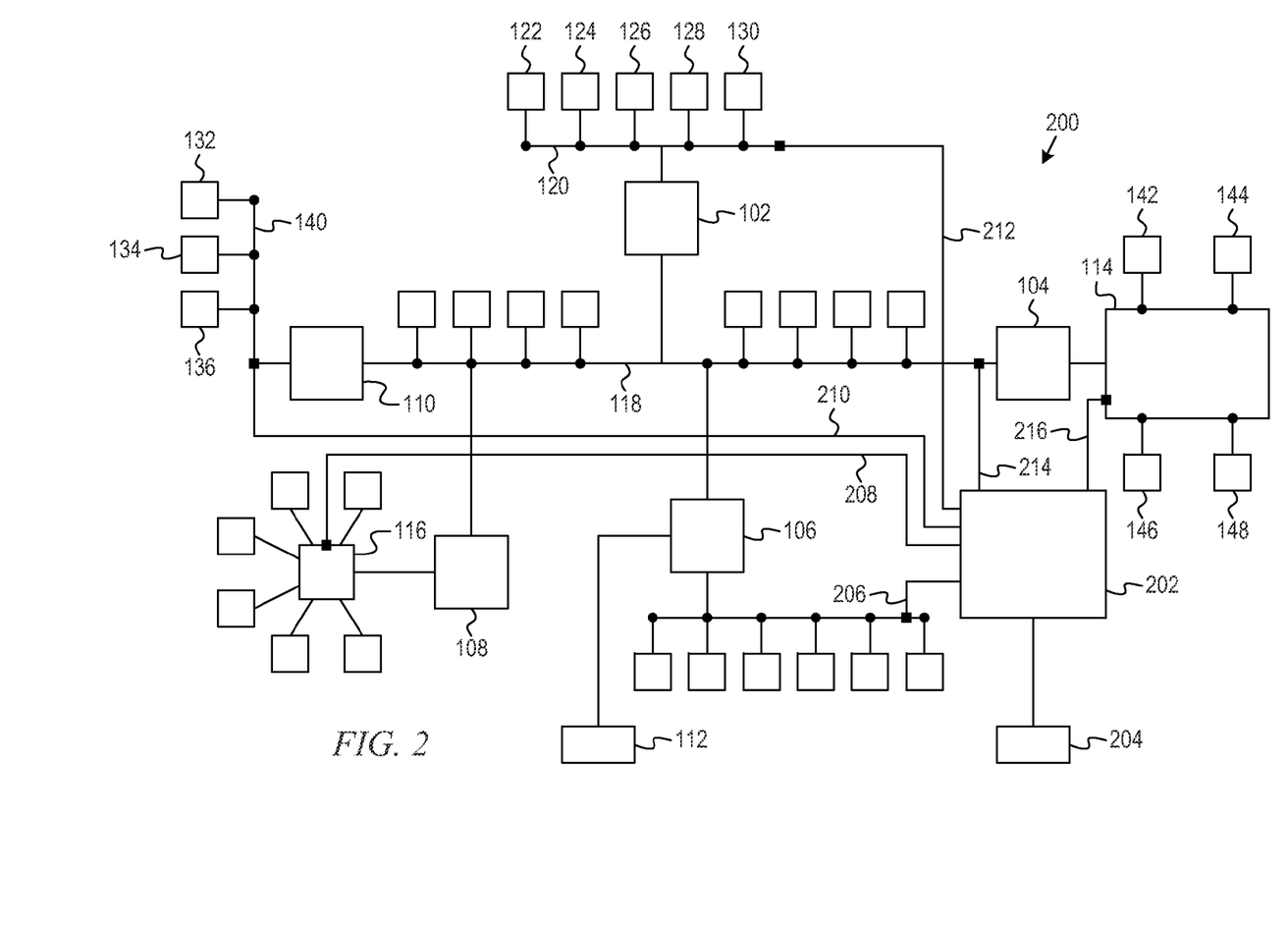
FIG. 2 illustrates the inventive hierarchical network having a data stream controller.

FIG. 2 shows an inventive networked embedded system 200 featuring a plurality of processing units or electronic control units 122, 124, 126, 128, 130, 132, 134, 136, 142, 144, 146 and 148. These processing units are heterogeneously arranged in different sub-networks 114, 116, 118, 120, 140. Each of these sub-networks may feature different data transmission rates as well as a different communication protocols. The gateway controllers 102, 104, 106, 108 and 110 serve to provide interaction and communication between the various sub-networks.

The network 200 further has a data stream controller 202 that is separately connected to any one of the sub-networks 114, 116, 118, 120 and 140. Moreover, the data stream controller 202 is connected to a data transmission port 204 that serves as an external access point to the network 200. Typically, the data stream controller 202 is connected to the data transmission port 204 via a high-speed data transmission line, such as e.g. an Ethernet connection. In particular, the data stream controller 202 is connected to sub-network 114 via transmission line 216, it is connected to sub-network 118 via transmission line 214, it is connected to sub-network 120 via transmission line 212, it is connected to sub-network 140 via transmission line 210 and it is connected to sub-network 116 via transmission line 208. Each one of the transmission lines 206, 208, 210, 212, 214 and 216 features at least the same data transmission rate as its corresponding sub-network. In this way data transmission from the data stream controller 204 to any one of the sub-networks can be performed with respect to the individual data transfer and data processing properties of each sub-network.

By separately coupling each sub-network to the data stream controller 202, the hierarchical structure of the network 200 is effectively abandoned. Transmission of diagnostic and/or maintenance and/or flashing data to and from a sub-network or associated processing units does no longer have to be provided by other sub-networks of the network 200. Instead, data referring to diagnostics, maintenance and flashing of a particular sub-network or a particular processing unit can be directly transmitted to the distinct processing unit or sub-network. This reduces the overall network traffic and releases the gateway controllers 102, 104, 106, 108, 110 to route such data to neighboring sub-networks.

For example, in prior art implementations, flashing data had to be fed into the diagnostic port 112 and may have to be processed by the gateway controller 106 and 110 until it was finally provided to any of the processing units 132, 134, 136. In contrast, by making use of the data stream controller 202 flashing data can be directly transmitted to the sub-network 140 via the transmission line 210.

Typically, the data stream controller 202 has a dynamic memory that allows to store the entire flashing data of the network 200. In particular, by implementing the transmission line between the data transmission port 204 and the data stream controller 202 as a high-speed transmission line, the entire flashing data might be fed into the data stream controller 202 within a very short time interval that may not even exceed a minute. Right after or even during data transmission to the data stream controller 202 via the data transmission port 204, various data packets might be concurrently transmitted to the various sub-networks 114, 116, 118, 120, 140. In this way flashing of a plurality of sub-networks and their corresponding processing units does no longer have to be performed sequentially but can be performed in a simultaneous manner.

In this way a flashing procedure of a heterogeneous and hierarchical network of processing units can be performed within a remarkably shorter time interval. This allows to tremendously reduce vehicle down-time and vehicle service expenses. By providing the network 200 with a data stream controller 202, the flashing procedure can be autonomously performed by the network itself. Generally, it is only required that the flashing data is fed into the data stream controller 202. Once the flashing data has been transferred to the data stream controller 202, the data stream controller 202 is adapted to autonomously perform the flashing procedure for any one of the sub-networks 114, 116, 118, 120, 140 in a concurrent way.

In an application scenario a vehicle might be connected to a service station for feeding flashing data into the data stream controller 202. After this feeding procedure the vehicle might be disconnected from the service station and may autonomously perform flashing of the sub-networks while the service station is free to provide flashing data to another vehicle. In this way, the invention provides efficient usage of vehicle service stations by displacing at least parts of the flashing procedure into the vehicle itself.

Apart from transmitting flashing data to various control units of the different sub-networks, the data stream controller 202 may also provide data exchange and communication between any processing units of different sub-networks. This is of particular advantage, if a gateway controller no longer operates properly. For example, if gateway controller 110 fails, the sub-network 140 and its associated control units 132, 134, 136 may no longer be accessed by any other control unit of the network 200. However, the sub-network 140 is still connected to the data stream controller 202 via transmission line 210. In this way the data stream controller 202 may take over a part of the complete functionality of the failed gateway controller 110. For example, the data stream controller 202 may provide data transmission and/or communication between processing unit 144 and processing unit 132 via transmission lines 216 and 210 if any one or both of the gateway controllers 110 and 104 fail.

Figure 3:
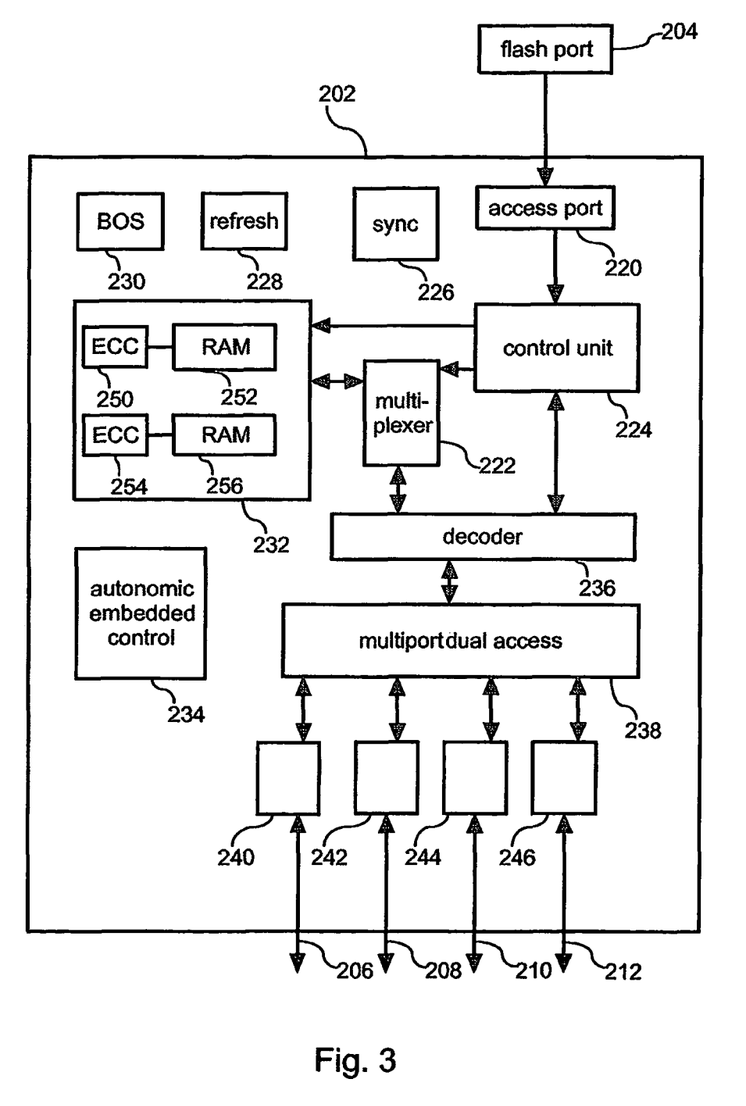
FIG. 3 shows a detailed block diagram of the internal structure of the data stream controller.

FIG. 3 shows a detailed block diagram of the data stream controller 202. The data stream controller 202 has a control unit 224, an access port 220, a synchronization module 226, a refresh control module 228, a brownout supply module 230, a multiplexer 222, a decoder 236, a multiport dual access module 238, an autonomic embedded control unit 234, a storage module 232 as well as various access points 240, 242, 244, 246. The storage module 232 typically has at least one random access memory module 252, 256, one of which serving as a redundant storage module. Additionally, the storage module 232 features error correction modules 250, 254 that allow to correct and to compensate storage errors in the random access memory modules 252, 256. Preferably, the random access memory modules 252, 256 are implemented as DDR-SDRAMs allowing for a fast mass storage of data.

The access port 220 of the data stream controller 202 serves as access point to the data transmission port 204. Typically, data transmission port or flash port 204 and the access port 220 are connected by means of a high-speed data transmission line, such as a high-speed Ethernet based connection. In this way a large amount of data can be inputted into the data stream controller 202 via the access port 220. The access port 220 is further adapted to provide the received data to the control unit 224, which in turn redirects the inputted data into the storage module 232. In this way the entire flashing data for a heterogeneous network can be stored by means of the storage module 232. This allows for a fast transmission of the required data into the data stream controller 202 and hence into the network 200.

During storage or right after storage of the data, the control unit 224 is adapted to read out the stored data from the storage module 232 either directly or by means of the multiplexer 222. The multiplexer effectively allows extracted portions of the stored data from the storage module 232 that have to be provided to a particular sub-network. Hence, the data source multiplexer 222 serves to identify and to separate sub-network specific data from the overall data stored by means of the storage module 232. Upon extracting data for the various sub-networks or processing units, the extracted data is provided to the decoder 236. Transmission of the data to the decoder 236 may be realized via the multiplexer 222 or by the control unit 224. However, the control unit 224 is further adapted to trigger the decoder 236.

The decoder 236 in turn serves to decode each data packet with respect to the communication protocol of a dedicated sub-network. Preferably, the multiplexing procedure performed by the multiplexer 222 and the subsequent decoding procedure executed by means of the decoder 236 are performed with a maximum data processing rate. Thereafter, the differently decoded data packets are fed into the multiport dual access module 238. This multiport dual access serves to feed the various data packets into the corresponding access points 240, 242, 244, 246 which in turn provide transmission of the data packets to the various sub-networks via the transmission lines 206, 208, 210 and 212.

In principle, the multiport dual access module 238 serves as a buffer for the transmission of the various data packets to the different sub-networks. Since the sub-networks differ with respect to data transmission rate, the multiport dual access module 238 is adapted to receive and to store the various decoded data packets from the decoder 236 at a maximum data transmission rate and to submit the received data packets with a network specific data transmission rate to the various access points 240, . . . , 246.

The synchronization module 226 serves to synchronize the incoming data stream from the flash-port 204 with the internal clock of the storage module 232 and the control unit 224. The refresh control module 228 serves to refresh and to trigger the storage module 232. Additionally, the data stream controller 202 may feature a brownout supply that guarantees operation of the data stream controller 202 even when the power supply for the data stream controller 202 starts to operate improperly.

The autonomic embedded control module 234 might be triggered by means of the control unit 224 in case of a failure of any one of the connected sub-networks or their corresponding gateways. In case of a failure of a sub-network or its gateway controller, a corresponding failure message might be transmitted to the data stream controller 202 via any one of the transmission lines 206, . . . , 212. The access points 240, . . . , 246 receiving the failure message provide a feedback to the control unit 224, which in turn may trigger the autonomic embedded control unit 234 for compensating or replacing functionality of the failed gateway controller by means of the data stream controller 202.

Preferably, the autonomic embedded control unit 234 may detect which of the gateway controllers 102, 104, 106, 108, 110 of the network 200 is subject to failure and may then control the multiport dual access 238, the decoder 236, the storage module 232 as well as the control unit 224 to take over or top replace the functionality of the failed gateway controller. For example, the autonomic embedded control unit 234 may serve to provide direct data transfer between data transmission lines 208 and 210 and therefore to provide direct data transmission between the corresponding sub-networks 116 and 140. In this way routing of this data transfer does no longer have to be provided by the sub-network 118 and the two gateway controllers 108 and 110. Required encoding and decoding of data packets as well as adaptation to different data transmission rates might be provided by means of the multiport dual access module 238, the decoder 236 in combination with the control unit 224 and the autonomic embedded control unit 234.

Figure 4:
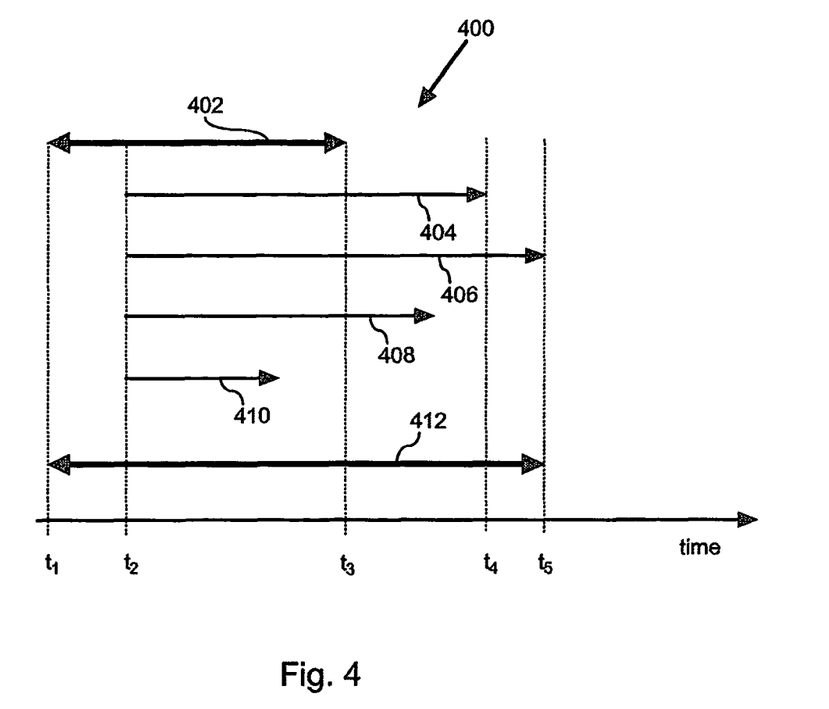
FIG. 4 shows a timing chart of a concurrent flashing of various sub-networks.

FIG. 4 illustrates a timing chart 400 illustrating the concurrent flashing procedure of the various sub-networks 114, 116, 118, 120. The arrow 402 corresponds to the time interval $t_3$-$t_1$ required for feeding the entire flashing data into the storage module of the data stream controller 202. At $t_3$ the complete flashing data has been transmitted to the data stream controller 202 and since the data is then already present within the network 200, the vehicle may already be disconnected from a service station that provided the flashing data.

The arrows 404, 406, 408, 410 illustrate the time intervals required for flashing the various corresponding sub-networks 114, 116, 118, 120. These time intervals may all vary due to the individual nature of the various sub-networks, i.e. the sub-networks may have different numbers of processing units, various communication protocols, various data exchange and data transmission rates and may require different amounts of flashing data. For instance, arrow 404 may correspond to the flashing time interval of sub-network 114, arrow 406 corresponds to sub-network 116, arrow 408 corresponds to sub-network 118 and arrow 110 corresponds to sub-network 120. As illustrated by the timing chart 400 flashing of the various sub-networks is performed concurrently and starts at point of time $t_2$.

At $t_2$ transmission of the entire flashing data into the storage of the data stream controller 202 has not yet terminated. Hence, the data stream controller 202 allows to start the various flashing procedures for the individual sub-networks even before the entire data has been fed into its storage module 232. This is particularly applicable when data transmission from the data transmission port 204 into the data stream controller 202 is performed at a higher data transmission rate than transmission of flashing data to the various sub-networks.

Arrow 412 specifies the total time interval required for performing the entire flashing procedure. The overall flashing procedure terminates when every separate flashing procedure for the various sub-networks has terminated. In this case flashing of sub-network 116 terminates at last at point of time $t_5$. Hence, the total flashing procedure then requires a time interval $t_5$-$t_1$. This time interval can further be split into time interval $t_3$-$t_1$ indicating the time required for feeding the data stream controller 202 by means of an external service station and the time interval $t_5$-$t_3$ during which the vehicle autonomously continues with the flashing procedure while being disconnected from the external service station.

Figure 5:
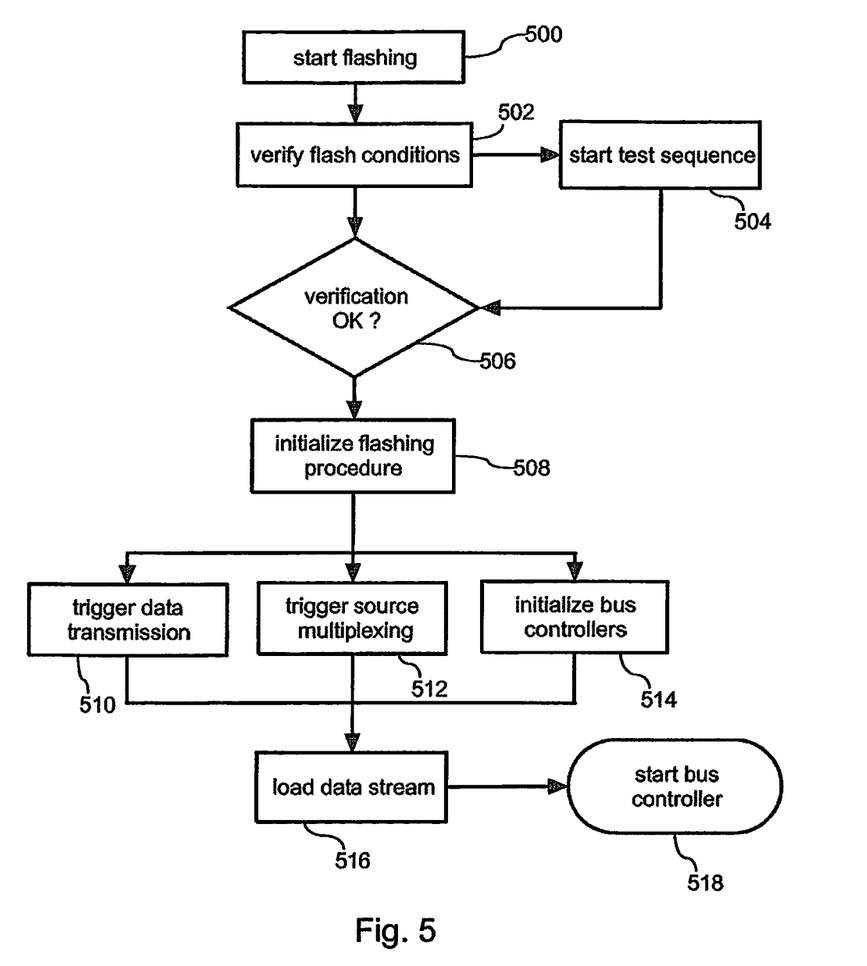
FIG. 5 shows a flowchart of the concurrent flashing procedure.

FIG. 5 is illustrative of a flowchart of performing the flashing procedure. In a first step 500 the flashing procedure is started by e.g. connecting the vehicle to an external service station via the data transmission port 204. Before the actual flashing procedure starts, it is first checked in step 502 whether the network 200 is ready for a flashing procedure and whether a flashing procedure is actually required. Verification of flash conditions in step 502 may trigger to start a test sequence 504 which is a kind of diagnostic procedure to gather status information of the various sub-networks and their processing units. After executing the test sequence in step 504, status information of the network 200 might be obtained that can be further exploited to perform the flashing procedure in an efficient way.

In step 506 the result of the verification of the flash conditions in step 502 and the result of the test sequence performed in step 504 are compared and verified. In case that the determined flash conditions and the diagnostic data match, i.e. allow for a successful flashing procedure, the method continues with the preceding step 508, where the flashing procedure is finally initialized. After initialization of the flashing procedure 508 steps 510, 512 and 514 are executed concurrently. Step 510 triggers the data transmission, i.e. feeding of flashing data into the data stream controller 202 and storing the flashing data by means of the storage module 232 of the data stream controller 202. In step 512 the source multiplexing is triggered, hence the multiplexer 222 is activated to read out data that is stored by the storage module 232. Moreover, the source multiplexing serves to extract various data packets for the various sub-networks and to feed these data packets into the decoder 236 and into the multiport dual access module 238. As a third concurrent step 514 the bus controllers 102, 104, 106, 108, 110 of the network 200 are initialized. This initialization refers to a reset of the various bus or gateway controllers 102, . . . , 110, such that the bus controllers do not interfere with any of their processing units during the following flashing procedure.

After performing steps 510, 512 and 514, the various data streams are transmitted to the various sub-networks in step 516. Hence, the flashing data is individually and separately transmitted to the various sub-networks and their corresponding processing units. After the flashing data has been fed into the non-volatile memories of the processing units, the flashing has substantially terminated and in the final step 518 the bus controllers or the gateway controllers 102, . . . , 110 are restarted and the entire network 200 returns to a normal operation mode.

What is claimed is:

1. A hierarchical network of processing its comprising:
   a plurality of sub-network comprising at least a first sub-network and a second sub-network, wherein each sub-network within the plurality of sub-networks comprises at least one processing unit and wherein each sub-network within the plurality of sub-networks is connected to the hierarchical network via a gateway controller; and
   a data stream controller directly coupled to each sub-network within the plurality of sub-networks and adapted to transmit data directly to processing units and gateway controllers within the plurality of sub-networks; and
   a diagnostic port directly coupled to the data stream controller,
   wherein the data stream controller is adapted to perform a diagnostic operation on at least a first gateway controller and processing unit within a first sub-network within the plurality of sub-networks and at least a second gateway controller and processing unit within a second sub-network within the plurality of sub-networks;
   wherein the diagnostic operation is a firmware flashing operation and wherein the data stream controller is adapted to flash the first gateway controller and processing unit within the first sub-network during a first time interval and the second gateway controller and processing unit within the second sub-network during a second time interval such that the data stream controller flashes the first gateway controller and processing unit within the first sub-network and the second gateway controller and processing unit within the second sub-network simultaneously during a time period that the first time interval and the second time interval overlap.

2. The network according to claim 1, wherein the diagnostic port is coupled to the data stream controller via a high-speed data transmission line and wherein the data steam controller has a dynamic memory.

3. The network according to claim 1, wherein the first and second sub-networks have different data transmission properties and make use of different communication protocols.

4. The network according to claim 1, wherein the data stream controller is adapted to directly feed data into any one of the processing units of the at least first and second sub-networks.

5. The network according to claim 1, wherein the data stream controller is further adapted to control the first gateway controller or the second gateway controller.

6. The network according to claim 1, wherein the data stream controller is adapted to transmit first data to the first sub-network using a first data transmission protocol and a first data transmission rate of the first sub-network and wherein the data stream controller is adapted to transmit second data to the second sub-network using a second data transmission protocol and a second data transmission rate of the second sub-network.

7. The network according to claim 1, wherein the diagnostic operation comprises gathering status information of the at least first and second sub-networks.

8. The network according to claim 5, wherein the data stream controller replaces the functionality of the first gateway controller responsive to the first gateway controller failing and wherein the data stream controller replaces the functionality of the second gateway controller responsive to the second gateway controller failing.

9. The network according to claim 1, wherein the processing units are implemented as electronic control units of a vehicle.

10. The network according to claim 1, wherein the first sub-network features a straight bus, a star network, or a ring-bus network topology and uses a control area network (CAN), local interconnect network (LIN), FlexRay, media oriented system transport (MOST), or FireWire data transmission standard.

11. A data stream controller for transmitting data to a hierarchical network of processing units, wherein the hierarchical network of processing units comprises a plurality of sub-networks comprising at least a first sub-network and a second sub-network, wherein the plurality of sub-networks comprises at least one processing unit and wherein each sub-network within the plurality of sub-networks is connected to the hierarchical network via a gateway controller, wherein the data stream controller is coupled to each processing unit and gateway controller of the first sub-network and the second sub-network and is directly coupled to a diagnostic port, the data stream controller comprising:

a storage for storing flashing data received via the data transmission port, wherein the data stream controller transmits data to processing units and gateway controllers within the plurality of sub-networks, a control unit for feeding the flashing data into the storage and for providing the first sub-network and the second sub-network with a first and second portion of the flashing data, wherein the control unit is adapted to flash at least a first gateway controller and processing unit within a first sub-network within the plurality of sub-networks during a first time interval and at least a second gateway controller and processing unit within a second sub-network within the plurality of sub-networks during a second time interval using the flashing data, such that the data stream controller flashes the first gateway controller and processing unit within the first sub-network and the second gateway controller and processing unit within the second sub-network simultaneously during a time period that the first time interval and the second time interval overlap.

12. The data stream controller according to claim 11, further comprising decoder module for decoding the at least first and second portions of the data with respect to a data transmission rate and with respect to a communication protocol of the at least first and second sub-networks.

13. The data stream controller according to claim 11, wherein the storage is implemented by means of synchronous dynamic random access memory (SDRAM) or double data rate synchronous dynamic random access memory (DDR-SDRAM).

14. A method of performing diagnostic operations on processing units of a hierarchical network comprising a plurality of sub-networks comprising at least a first sub-network and a second sub-network, wherein the plurality of sub-networks comprises at least one processing unit and wherein each sub-network within the plurality of sub-networks is connected to the hierarchical network via a gateway controller, the method comprising:

communicating diagnostic information between a data stream controller by making use of a high-speed data transmission port directly coupled to the data stream controller, wherein the data stream controller is directly coupled to each sub-network within the plurality of sub-networks and adapted to transmit data to processing units and gateway controllers within the plurality of sub-networks, performing, by the data stream controller, a diagnostic operation on at least a first gateway controller and processing unit within a first sub-network within the plurality of sub-networks and a second gateway controller and processing unit within the plurality of sub-networks, wherein the diagnostic operation is a firmware flashing operation and wherein the data stream controller is adapted to flash the first gateway controller and processing unit within the first sub-network during a first time interval and the second gateway controller and processing unit within the second sub-network during a second time interval such that the data stream controller flashes the first gateway controller and processing unit within the first sub-network and the second gateway controller and processing unit within the second sub-network simultaneously during a time period that the first time interval and the second time interval overlap.

15. The method according to claim 14, further comprising starting flashing the processing units or gateway controllers within the plurality of sub-networks prior to termination of feeding the data into the data stream controller.

16. The network according to claim 1, wherein the data stream controller is configured to start flashing the processing units or gateway controllers within the plurality of sub-networks prior to termination of feeding the data into the data stream controller.

17. The data stream controller according to claim 11, wherein the control unit is adapted to flash the first gateway controller and processing unit within the first subnetwork and the second gateway controller and processing unit within the second sub-network within at least partially overlapping time intervals.

18. The data stream controller according to claim 11, wherein the control unit is adapted to transmit first data within the flashing data to the first sub-network using a first data transmission protocol and a first data transmission rate of the first subnetwork and wherein the control unit is adapted to transmit second data within the flashing data to the second sub-network using a second data transmission protocol and a second data transmission rate of the second sub-network.

* * * * *